April 19, 1960   D. M. SAUTER ET AL   2,933,614

CONTROL SYSTEM FOR GENERATOR

Filed May 7, 1958

WITNESSES

INVENTORS
Donald M. Sauter &
Richard E. Wendt, Jr.
BY
ATTORNEY

United States Patent Office 2,933,614
Patented Apr. 19, 1960

2,933,614

CONTROL SYSTEM FOR GENERATOR

Donald M. Sauter, Monroeville, and Richard E. Wendt, Jr., Edgewood, Pa., assignors to Westinghouse Electric Corporation, East Pittsburgh, Pa., a corporation of Pennsylvania Application May 7, 1958, Serial No. 733,589

6 Claims. (Cl. 290—40)

This invention relates to a control system for a generator, and more particularly to the individual control circuit arrangement for one generator of a power station in a power system.

In the automatic control of generators for power systems in which generators are tied into the complete system network, it is necessary to derive from a network signal received from some central point such as a dispatching office, a signal for the generator for dictating the share of network load to be assumed by the generator. The generator control shown in this application necessarily needs an input from a central location such as a dispatching office similar to the type shown in Patent No. 2,888,575 entitled "Automatic Dispatching System," issued May 26, 1959, to the inventors M. J. Brown and R. B. Squires and assigned to the common assignee.

It is therefore an object of this invention to provide a simple loading control arrangement for a generator in a power station.

It is another object of this invention to provide a generator control system capable of responding to rapid load changes as well as gradual load changes in the system associated with the generator.

It is another object of this invention to provide a generator control arrangement providing a stabilizing feedback control to prevent oscillations of the generator in the control system.

It is another object of this invention to provide selective rapid or slow generator output changes in response to system requirements.

Other objects, purposes and characteristic features will become obvious as the description of the invention progresses.

In practicing this invention, there is provided an input circuit to a suitable amplifier and control relay capable of receiving and summing rapid swing changes, slower trend changes, and feedback controls from the station and individual generator for stabilizing purposes. The control relay is then connected to a governor control for regulating energy input to a prime mover driving the associated generator which is in turn connected to an output circuit for a system.

In each of the views, similar parts bear like reference characters.

Figure 1:
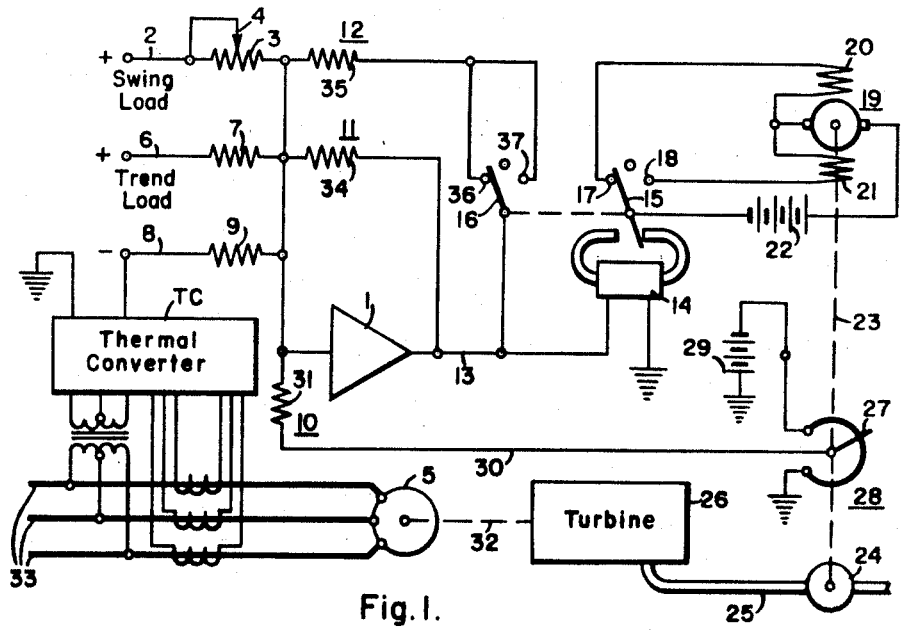
Figure 1 is a diagrammatic view of one embodiment of a generator control involving this invention.

In the circuit of Fig. 1, there is provided an amplifier 1 of any suitable well-known type, preferably of a direct current or analog operational amplifier arrangement provided with several inputs controlling the output of the amplifier 1. The first input received from the conductor terminal point 2 from a suitable dispatching office (not shown) is a rapid load change positive polarity input responding to any rapid changes in the system and is called the swing-load input. The summing resistor 3 connected to the input terminal point 2 is provided with a variable tap 4 capable of being adjusted to establish the maximum participation deemed desirable for an associated generator 5. A second conductor 6 provided with a summing series resistance 7 is also connected to the input of the amplifier 1 and connected to the output of the dispatching office (not shown) to receive a positive polarity voltage indicating the overall trend loading of the system established by the system caused integrator such as shown in the aforementioned patent. The conductor 8 provided with a series summing resistor 9 is connected to a thermal converter TC responsive to the output of the associated generator 5 through a suitable thermal converter (not shown) to act as a negative feedback control stabilizing the output of the amplifier, dictating the output of the generator 5. The thermal converter can be of any well known commercial type. The feedback circuit from which this voltage would be received is also shown in aforementioned patent.

The amplifier 1 is provided with three additional feedback circuits 10, 11 and 12, further explained hereinafter.

The output of the amplifier 1 is fed over the conductor 13 to the winding of a suitable relay such as a polarized relay 14 provided with a pair of movable contacts 15 and 16. The relay 14 is a three-position relay including the two extreme positions to the right and left and an off-position located therebetween. The relay could also be of an electro-dynamometer type using an alternating current input.

The two extreme position contacts 17 and 18 of the relay movable contact 15 are connected to a governor drive motor 19 provided with two series field windings 20 and 21 capable of providing rotation in either the forward direction or in the reverse direction. If for example the contact 15 is in its left hand position as shown in the drawing, the motor 19 would be energized over a circuit that can be traced from the contact extreme position 17 thorugh the series field winding 20, the armature of the motor 19, the direct current source of power 22, and through the movable contact 15 to the extreme position contact 17, of the relay 14. If the movable contact member 15 had been in the right hand extreme position, the circuit would be traced from the extreme position contact 18 through the series field winding 21, the armature of the motor 19, the source of direct current power 22, back to the movable contact member 15. In this case, a reversal of the motor 19 would occur due to the reversal of flux established by the series field winding 21.

Movement of the motor 19 armature causes the shaft 23 to drive a suitable steam valve 24 to control the entry of steam through the conduit 25 into any suitable turbine 26 causing the turbine to adjust its load in proportion to the setting of the steam valve 24. In addition, the shaft 23 has connected thereto a movable arm 27 of a suitable potentiometer 28 connected across a source of direct current power 29 to provide suitable feedback energy on the conductor 30 in response to the position of the movable arm 27 on the potentiometer 28. The feedback energy is fed into the feedback circuit 10 provided with a series summing resistor 31.

The turbine 26 is provided with an output shaft 32 connected to the alternator or generator 5 for driving the generator to produce an output on the conductors 33.

In order to provide a proportional drive control of the steam valve 24 in response to the output of the direct current amplifier 1, a pair of feedback circuits 11 and 12 is provided.

Feedback circuit 11 is provided with a series summing resistor 34 connected between the output conductor 13 and the input of the amplifier 1 and the feedback is provided for stabilization of the amplifier 1 output. In addition to this feedback however, there is provided the feedback circuit 12 including the series summing resistor 35 and the movable contact 16 of the relay 14. When the movable contact 16 is in either of its extreme positions contacting the fixed contacts 36 and 37, it can be seen that a feedback from the conductor 13 through the summing resistor 12 will occur. It can also be seen that the length of time that the contact 16 is in contact with either extreme, contact point 36 or 37 will determine the amount of feedback being sent over the feedback circuit 12.

If we assume for explanation purposes that the incoming summed signal from the swing and trend loading is quite large demanding a considerable increase in power to be delivered by the generator 5, it will be obvious that the output of the amplifier 1 will be of considerable size causing the relay contacts 15 and 16 to move to their extreme increase position causing the motor 19 to increase steam flow through the valve 24 to the turbine 26. Since the output increase desired by the generator 5 is of considerable size, the relay will remain in its extreme position for a considerable period of time. When the generator output reaches the desired requested output, the difference of signal strength between the input circuits 2 and 6 and the feedback circuits including the feedback on the conductor 8, the feedback circuit 10, feedback circuit 11, and feedback circuit 12 will be reduced to cause the output from the amplifier 1 to decrease to zero causing the relay 14 to move to its neutral or off position. During the decreasing period or during a period when the incoming control signals in the conductors 2 and 6 are small, the output from the amplifier 1 also becomes small causing the relay contacts 15 and 16 to move to the desired extreme position, which in turn causes the feedback over the feedback circuit 12 of sufficient size to reduce the output of the amplifier 1 momentarily to zero or approximately zero causing the relay contacts to again assume their off position. Movement of the contacts 15 and 16 to the off position interrupts the feedback circuit 12 causing the amplifier 1 to again become active resulting in energization of the relay 14 again. This pulsing of the relay 14 continues until such time that the feedback voltages on the feedback circuit 10, feedback conductor 8, the feedback circuits 12 and 11 neutralize the incoming signal on the conductors 2 and 6. It can be seen therefore that movement of the governor control motor 19 during this pulsing control is very slow and becomes slower as the desired output of the generator 5 is approached until such time that the output is reached and the relay 14 assumes its off position.

Figure 2:
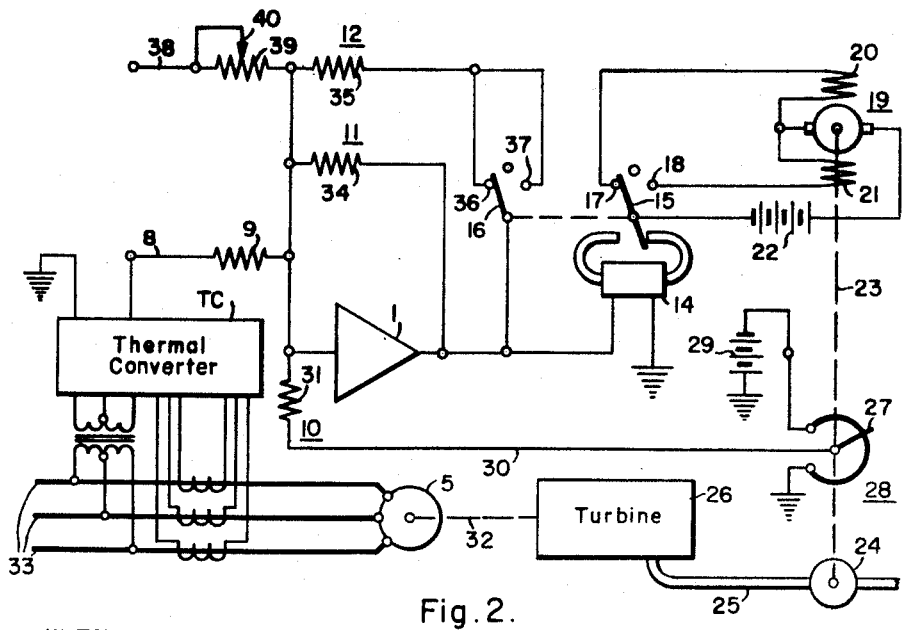
Fig. 2 is a modified view of a circuit arrangement involving this invention.

The circuit of Fig. 2 is identical with the circuit of Fig. 1 explained hereinbefore with the exception that the swing and trend load signals have been combined at the dispatchers office resulting in a single input signal over the conductor 38 and summing resistor 39 having again a variable tap 40 for adjusting the input participation desired to be dictated to this generator. The remaining feedback circuits are identical and function exactly the same as the feedback circuits described in Fig. 1. Further description of this circuit is felt to be unnecessary other than to say that the input signal is now a single signal over the conductor 38 supplied from the dispatching office of the system involved.

Since numerous changes may be made in the above-described construction, and different embodiments of the invention may be made without departing from the spirit and scope thereof, it is intended that all matter contained in the foregoing description or shown in the accompanying drawing shall be interpreted as illustrative, and not in a limiting sense.

We claim as our invention:

1. A generator output control circuit comprising a generator and prime mover, governor means for regulating said prime mover, relay means connected to said governor means for controlling said governor means, amplifier means having an output circuit connected to control said relay means, input means connected to said amplifier means for establishing generator output, first feedback means connected to said governor for opposing said input in response to governor operation, second feedback means connected to said amplifier to oppose said input in proportion to said amplifier input to said relay, a third feedback means connected between said amplifier output circuit and the input to said amplifier, said third feedback having a contact of said relay connected therein to control the feedback energy in response to the output to said relay and governor.

2. A generator output control circuit comprising a generator and prime mover, governor means for regulating said prime mover, relay means connected to said governor means for controlling said governor means, amplifier means having an output circuit connected to control said relay means, input means connected to said amplifier means providing an input signal for establishing generator output, first feedback means connected to said governor and providing a feedback signal for opposing said input signal in response to governor operation, second feedback means connected to said amplifier and providing a feedback signal to oppose said input signal in proportion to said amplifier input to said relay, summing means for combining said input signal and said feedback signals to provide a combined input to said amplifier.

3. A generator output control circuit comprising a generator and prime mover, governor means for regulating said prime mover, relay means connected to said governor means for controlling said governor means, amplifier means having an output circuit connected to control said relay means, input means connected to said amplifier means providing an input signal for establishing generator output, first feedback means connected to said governor and providing a feedback signal for opposing said input signal in response to governor operation, second feedback means connected to said amplifier and providing a feedback signal to oppose said input signal in proportion to said amplifier input to said relay, said input means comprising separate input signal voltages for rapid swing load changes and integrated trend load changes.

4. A generator output control circuit comprising a generator and prime mover, governor means for regulating said prime mover, relay means connected to said governor means for controlling said governor means, amplifier means having an output circuit connected to control said relay means, input means connected to said amplifier means providing an input signal for establishing generator output, first feedback means connected to said governor and providing a feedback signal for opposing said input signal in response to governor operation, second feedback means connected to said amplifier and providing a feedback signal to oppose said input signal in proportion to said amplifier input to said relay, said input means providing a single input signal voltage for rapid swing and integrated trend load changes.

5. A generator output control circuit comprising a generator and prime mover, governor means for regulating said prime mover, relay means connected to said governor means for controlling said governor means, amplifier means having an output circuit connected to control said relay means, input means connected to said amplifier means for establishing generator output, first feedback means connected to said governor for opposing said input in response to governor operation, second feedback means connected to said amplifier to oppose said input in proportion to said amplifier input to said relay, a third feedback means connected between said amplifier output circuit and the input to said amplifier, said third feedback having a contact of said relay connected therein to control the feedback energy in response to the output to said relay and governor, said contact being capable of completing said third feedback circuit when said contact is in either of its extreme positions in response to relay energy.

6. A generator output control circuit comprising a generator and prime mover, governor means for regulating said prime mover, relay means connected to said governor means for controlling said governor means, amplifier means having an output circuit connected to control said relay means, input means connected to said amplifier means for establishing generator output, first feedback means connected to said governor for opposing said input in response to governor operation, second feedback means connected to said amplifier to oppose said input in proportion to said amplifier input to said relay, and a fourth feedback means for providing an additional opposing voltage in response to generator output.

References Cited in the file of this patent

UNITED STATES PATENTS

| | | |
|---|---|---|
| 2,558,729 | Buechler | July 3, 1951 |
| 2,622,236 | White | Dec. 16, 1952 |
| 2,743,097 | Carolus et al. | Apr. 24, 1956 |